(12) United States Patent
Donakowski et al.

(10) Patent No.: US 6,928,812 B2
(45) Date of Patent: Aug. 16, 2005

(54) SMA ACTUATOR SAFETY MECHANISM

(75) Inventors: William J. Donakowski, El Sobrante, CA (US); Mark A. Gummin, St. Helena, CA (US); Geoffrey Gaines, Berkeley, CA (US)

(73) Assignee: Perihelian, LLC, Berkeley, CA (US)

( * ) Notice: Subject to any disclaimer, the term of this patent is extended or adjusted under 35 U.S.C. 154(b) by 47 days.

(21) Appl. No.: 10/632,170

(22) Filed: Jul. 30, 2003

(65) Prior Publication Data

US 2004/0020200 A1 Feb. 5, 2004

Related U.S. Application Data

(63) Continuation-in-part of application No. 10/056,233, filed on Dec. 3, 2001, now Pat. No. 6,762,515, which is a continuation of application No. 09/566,446, filed on May 8, 2000, now Pat. No. 6,326,707.

(51) Int. Cl.[7] ............................................. F01B 29/10
(52) U.S. Cl. ....................................................... 60/527
(58) Field of Search ........................... 60/527, 528, 529

(56) References Cited

U.S. PATENT DOCUMENTS 4,706,758 A * 11/1987 Johnson ........................ 169/19
6,016,096 A * 1/2000 Barnes et al. ................ 337/123
6,326,707 B1 * 12/2001 Gummin et al. ............... 310/12
6,371,030 B1 * 4/2002 Gilman et al. ............... 102/529
6,762,515 B2 * 7/2004 Gummin et al. ............... 310/12

* cited by examiner

*Primary Examiner*—Hoang Nguyen
(74) *Attorney, Agent, or Firm*—Howard Cohen

(57) ABSTRACT

A method and apparatus for preventing the unintended activation of SMA devices by ambient temperatures that exceed the phase transition temperature of the SMA material itself. In one embodiment a passive actuator is coupled to an active actuator, each having identical arrangements of SMA wire, but connected in opposite directions to compensate for temperature drift that is not due to powered heating. A second embodiment consists of a passive SMA wire connected to a latch/release mechanism allowing the actuator itself to move rather than moving the load. In a third embodiment the passive wire is connected to a load coupling, so that the load itself is disconnected from the actuator when the passive wire reaches the phase transition temperature. The passive wire may be made of a lower-temperature wire than the active wires, so that the release action occurs long before the active wire begins to be moved by ambient temperature.

30 Claims, 6 Drawing Sheets

SMA ACTUATOR SAFETY MECHANISM

CROSS-REFERENCE TO RELATED APPLICATIONS

This application is a continuation-in-part of U.S. application Ser. No. 10/056,233, filed Dec. 3, 2001, now U.S. Pat. No. 6,762,515, which in turn is a continuation of application Ser. No. 09/566,446, filed May 8, 2000, now U.S. Pat. No. 6,326,707, issued Dec. 4, 2001, for which priority is claimed.

FEDERALLY SPONSORED RESEARCH

Not applicable.

SEQUENCE LISTING, ETC ON CD

Not applicable.

BACKGROUND OF THE INVENTION

1. Field of the Invention

This invention relates to linear actuators and, in particular, linear actuators that employ shape memory alloy (SMA) elements to provide their motive power.

2. Description of Related Art

A new category of linear actuators employing SMA wire was introduced in U.S. Pat. No. 6,326,707, issued Dec. 4, 2001. These linear motors achieve useful displacement with significant force through the use of a Displacement Multiplied SMA mechanism. It is expected that SMA actuators will gain widespread acceptance and use in the near future, due to the fact that they produce much higher output force relative to their weight than current technologies (largely motors and solenoids). Their compact size allows them to fit into much smaller envelopes than existing actuators, solving numerous 'real-estate' and engineering issues. SMA actuators are long-lasting, easily performing a hundred thousand cycles. They can be manufactured simply, and in large quantities, inexpensively.

Due to the fact that the SMA motive elements (generally wires) are activated by thermal cycling, these devices are inherently sensitive to ambient temperatures, and susceptible to spontaneous actuation when the ambient temperature exceeds the SMA transition temperature. Nitinol wire is available commercially in formulations that have phase transition temperatures of 70° C. (LT) and 90° C. (HT). Thus if the ambient temperature exceeds these phase transition temperatures, the device will actuate inadvertently, with unpredictable and perhaps unfortunate consequences.

The specifications for many products and mechanical assemblies have ambient temperature tolerances that may exceed the phase transition temperatures of commonly available shape memory materials. For example, automobile manufacturers have operation and safety margins that most often require survivability, and even operability, in the temperature range of 100° C. to 120° C., which is greater than the transition temperature of Nitinol wires known in the prior art. There is an unmet need in the prior art for SMA actuators that can operate normally (intentionally actuated by powered operation) yet are prevented from operating spontaneously when the ambient temperature exceeds the SMA phase transition temperature. This need exists even if SMA materials are improved to transition at higher temperatures, for there will always be some uses for SMA devices that push the temperature limits of the materials.

BRIEF SUMMARY OF THE INVENTION

The present invention generally comprises a method and apparatus for preventing the accidental activation of SMA devices by ambient temperatures that exceed the phase transition temperature of the SMA material itself. The invention introduces an Over-Temperature Release Device (OTRD). The passive OTRD is generally external to the active actuator, so that it is in good thermal contact with the ambient temperature (the inside of a door panel, for instance). When the ambient temperature exceeds the onset temperature of the powered actuator, the OTRD releases a latch that prevents the displacement multiplied SMA (DM-SMA) from performing the intended work.

One important feature of this release mechanism is that the intended work cannot be performed above the normal actuation temperature. In many cases, this is actually a benefit for the intended function, and in other instances, it is an acceptable mode of operation. In addition, the active wire is not harmed or damaged in any way during the temperature excursion, since it also is free to move unimpeded if it does experience similar temperatures as the exposed, passive wire. It is also significant that the OTRD resets, allowing normal operations when the temperature returns to the normal temperature range.

In addition to exposing the passive wire to the ambient environment, the active wire can be substantially shielded from the environment for long periods of time. Even simple plastic cases can provide a high degree of thermal insulation, protecting the inside of the case for long time-periods from temperature excursions outside of it.

There are three general embodiments of the OTRD temperature compensation devices. All three employ passively heated shape memory alloy wires (bathed in the ambient environment), and actively controlled SMA wire actuators. One embodiment consists of a passive actuator coupled to an active actuator, each having identical amounts of SMA wire, but connected so as to compensate exactly for any temperature drift that is not due to powered heating. That is, one actuator is connected to another in opposing directions, one powered, the other unpowered. A second general embodiment consists of a passive SMA wire that is connected to a latch/release mechanism allowing the actuator itself to move against the force of a return spring when released. In a third general embodiment the passive wire is connected to a load coupling, so that the load itself is disconnected from the actuator when the passive wire reaches the phase transition temperature.

In any of these embodiments, the passive wire may be made of a lower-temperature wire than the active wire, so that the release action occurs long before the active wire begins to be moved by ambient temperature. The "LT" wire may also be stressed so that it actuates at a slightly higher, and better-defined, temperature, and so release is further guaranteed.

DETAILED DESCRIPTION OF THE INVENTION

The present invention generally comprises an overtemperature safety mechanism that prevents spontaneous, inadvertent actuation of a SMA actuator due to high ambient temperatures and the like. In this description, the term "safety" as used herein follows the definition "a device designed to prevent a mechanism from being operated unintentionally, for example, one that keeps a gun from being fired by accident or an elevator from falling."

Figure 15:
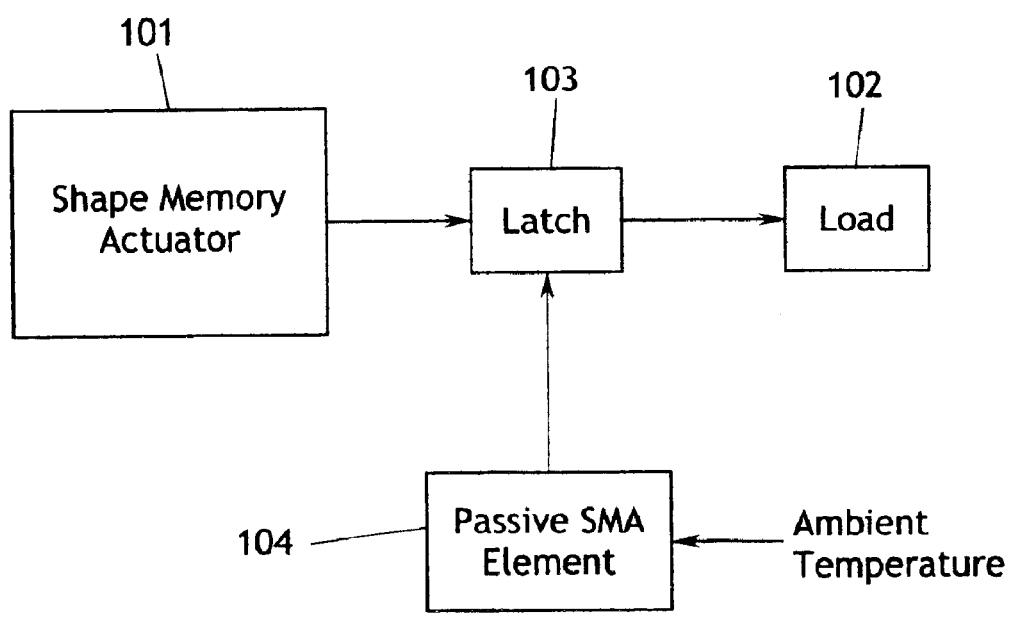
FIG. 15 is a functional block diagram depicting the fundamental elements of the present invention.

With regard to FIG. 15, the fundamental components of the invention include a SMA actuator 101 and a load 102 which is connected to receive useful work from the actuator 101 in the form of translation, rotation, displacement, or the like. A latch 103 is connected between the SMA actuator 101 and the load 102 to selectively disconnect the load from the actuator, or to disconnect the actuator from mechanical ground, or otherwise prevent the actuator from delivering an actuating stroke to the load. The latch is operated by a passive SMA element 104 which is exposed to ambient temperature more so than the actuator 101, or which has a lower phase transition temperature. That is, the element 104 is designed to be activated by ambient temperatures exceeding its phase transition temperature before the actuator 101 is activated by ambient temperature exceeding the phase transition temperature of the actuator 101. Thus the load cannot receive work from the actuator 101 if high ambient temperatures cause the actuator 101 to be activated unintentionally.

Figure 1:
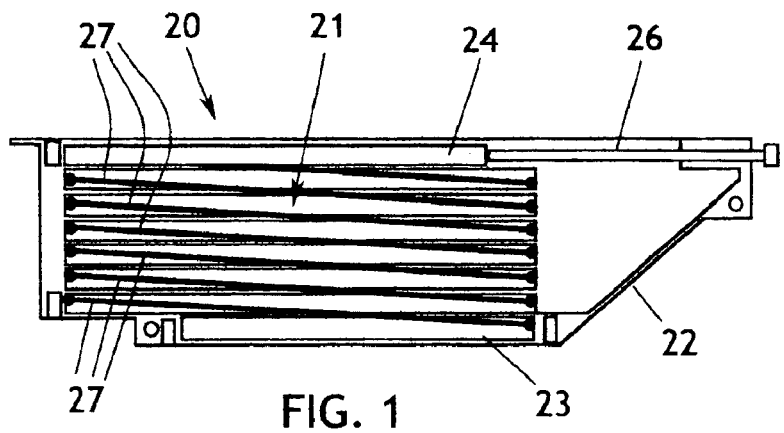
FIG. 1 is a cross-sectional side elevation showing a typical prior art SMA linear actuator in the quiescent (retracted) disposition.
Figure 2:
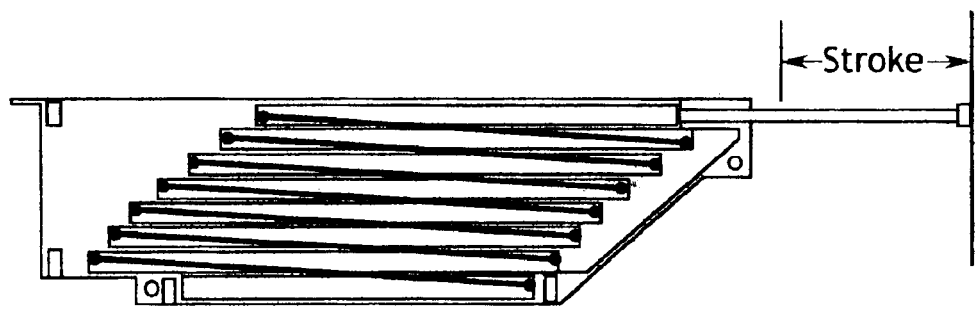
FIG. 2 is a side elevation as in FIG. 1, showing the linear actuator in the activated (extended) disposition.

With regard to FIG. 1, an exemplary SMA linear actuator 20 known in the art includes a plurality of rods or links 21 disposed in longitudinally aligned, vertically stacked relationship, the link constrained to slide longitudinally with respect to vertically adjacent links by a housing 22. The bottom link 23 of the stack is mechanically grounded to the case 22, and the top link 24 is connected to an output rod 26 which is translatable reciprocally along its axis. A plurality of SMA wires 27, formed of Nitinol™, Flexinol™, or similar phase transition shape memory material, are arranged so that each wire 27 is connected between one end of a link 21 and the opposite end of a vertically adjacent link 21. When the wires are extended (at a temperature below the phase transition temperature) the links 21 are stacked vertically as shown in FIG. 1. When the wires are heated and contracted, as shown in FIG. 2, the contracted wires cause each link 21 to slide to the right with respect to the subjacent link. Thus the displacement of the links is added, and the cumulative displacement is carried out by the translation of link 24 and associated output rod 26. The wires may be heated by electric current applied by a control circuit, and the links return to the quiescent condition of FIG. 1 upon cooling, due either to an Intrinsic Return Mechanism (described in copending U.S. application Ser. No. 10/200, 672, filed Jul. 22, 2002), or a return spring, or both.

As noted in the discussion above, the SMA wires 27 may be actuated inadvertently by exposure to ambient temperatures exceeding the phase transition temperature of the SMA material. One embodiment of an overtemperature safety mechanism comprises a pair of SMA linear actuator assemblies 20A and 20B each formed substantially as shown in FIG. 1 (housing omitted for clarity). Here actuator 20B is effectively a combination of elements 103 and 104 of FIG. 15. The actuators 20A and 20B are disposed in vertically stacked relationship, with the lowest link of the lower actuator 20B mechanically connected to ground, and the lowest link of actuator 20A being connected to the upper most link of actuator 20B. It is significant that the actuator 20B is not powered, and may be actuated only by exposure to excessive ambient temperature; whereas the actuator 20A is connected to a controlled electrical source to be intentionally and selectively actuated by electrical power. Furthermore, the two actuators are arranged to operate in opposite directions, so that their reactions to exceeding the phase transition temperature occur in opposing directions.

Figure 4A:
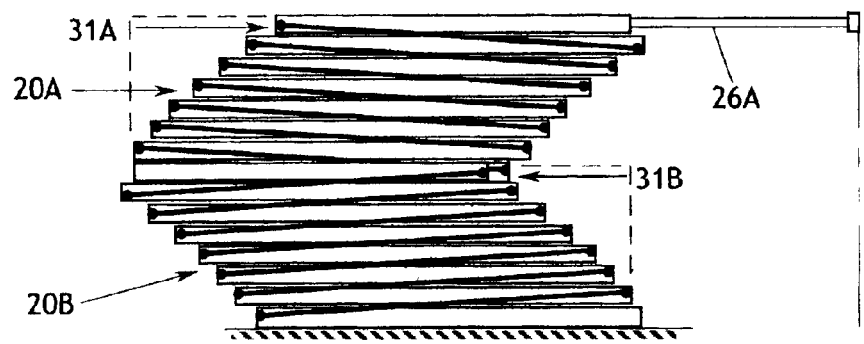
FIGS. 4A–4C are a sequence of views depicting the possible actuation states of the embodiment shown in FIG. 3.

Thus, as shown in FIG. 4A, wherein both actuators 20A and 20B have been triggered by excessive ambient temperature, actuator 20A has extended to the right as indicated by arrow 31A, an action due merely to the SMA wires contracting after being heated past transition by the ambient temperature. However, the actuator 20B, which extends in the opposite direction when activated, as shown by arrow 31B, serves to counteract the extension of rod 26A by moving retrograde with respect to the motion of rod 26A. Given that the two actuators are substantially similar in physical configuration, the opposite motions are offsetting, and the net effect is that combined mechanism does not undergo an actuation stroke. Thus an overtemperature condition cannot cause a spontaneous, inadvertent activation of the linear actuator.

Figure 3:
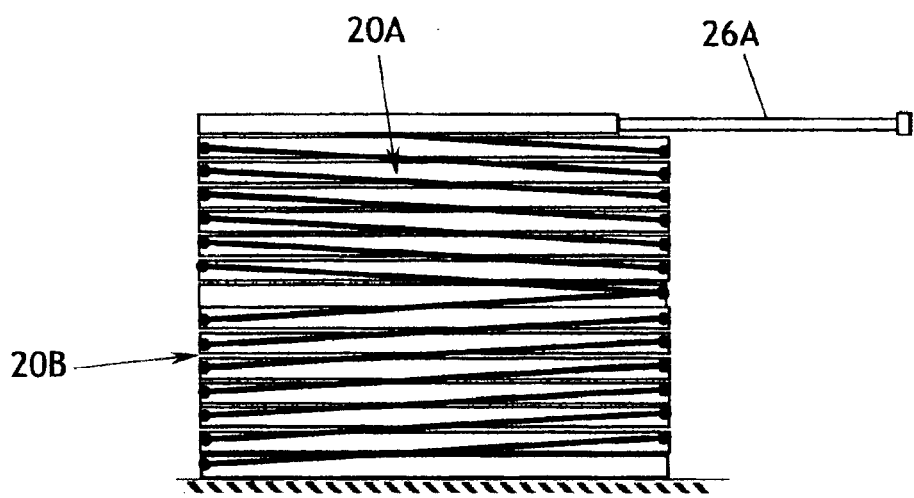
FIG. 3 is a cross-sectional side elevation depicting one embodiment of the present invention in which two SMA linear actuators are coupled in a over-temperature compensation mechanism.
Figure 4B:
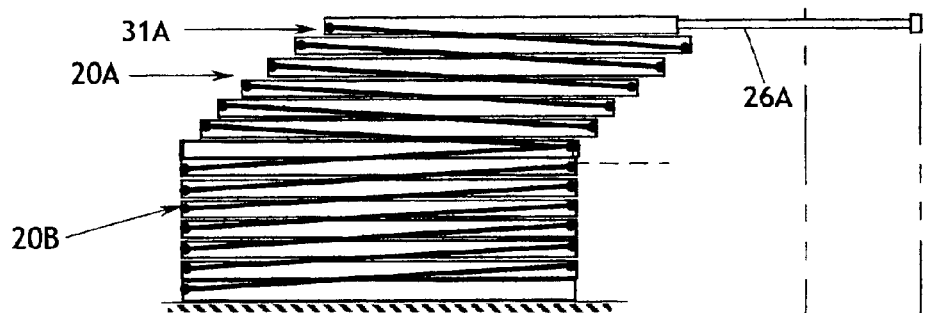
Figure 4C:
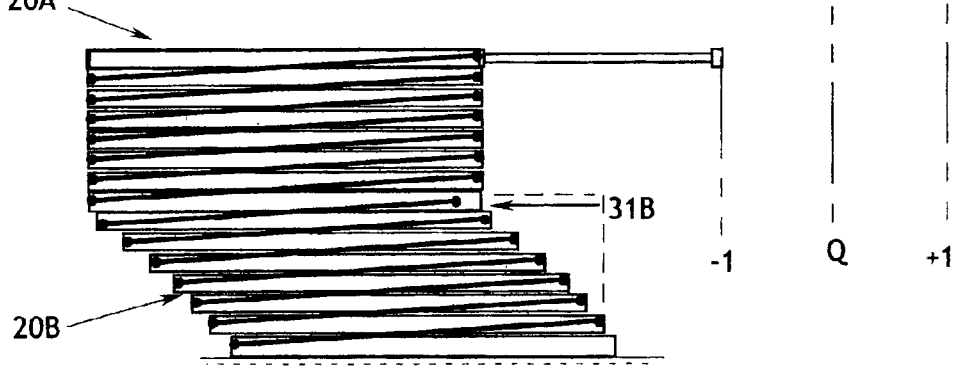

With regard to FIGS. 4B and 4C, a further variant of the assembly of FIG. 4A provides actuators 20A and 20B as described previously, with the added factor being that the actuator 20B is selectively powered in the same manner as actuator 20A. Thus when both actuators are in a quiescent disposition (FIGS. 3 or 4A) the output rod 26A is disposed at position Q. If actuator 20B is selectively activated while actuator 20A remains quiescent, as shown in FIG. 4C, the output rod 26A is translated to the −1 position. Conversely, actuator 20A is selectively activated while actuator 20B remains quiescent, the output rod 26A is translated to the +1 position. The result is a three position device, similar to a single throw, double pole switch. It is significant that the overtemperature compensation protection remains effective, in that overtemperature causes the assembly to remain in the quiescent (Q) position.

Figure 5:
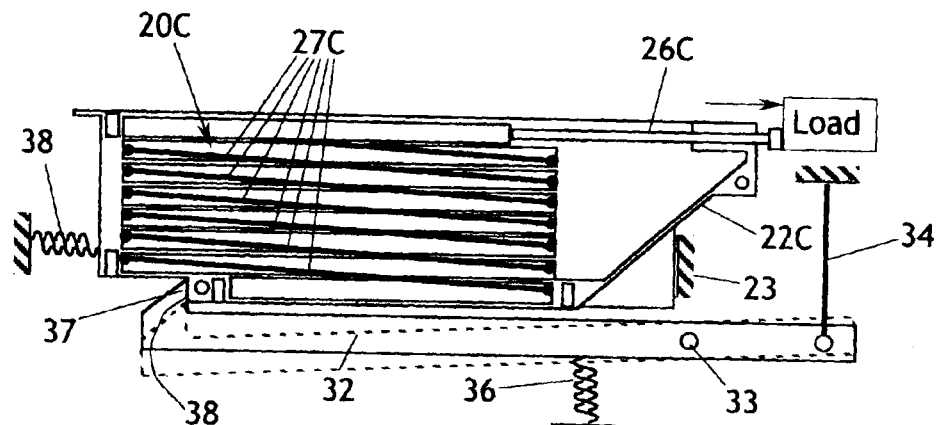
FIG. 5 is a cross-sectional side elevation depicting another embodiment of the present invention in which a passive SMA wire operates an overtemperature release mechanism.

With regard to FIG. 5, a further embodiment of the invention provides a linear actuator assembly 20C substantially as described with regard to FIGS. 1 and 2 (corresponding components are given the same reference numeral with the suffix "C"). The housing 22C is constrained to translate in a direction parallel with the axis of the output rod 26C, and when the house is translated to the left a spring 38 provides a resilient restoring force to return the housing to the rightward position of FIG. 5. A lever 32 is mounted adjacent to the housing 22C and pivots about a fulcrum 33. The right end of the lever 32 is connected to a passively operating SMA wire that extends to a mechanical ground. At the other end of the lever, a latch 37 engages a lip 39 on the housing to prevent leftward translation of the housing 22C.

In typical operation, electrical heating of the SMA wires 27C causes the device 20C to be actuated as shown in FIG. 2, so that the output rod 26C pushes the load to the right and does useful work. However, when the passively activated wire 34 is heated by ambient conditions beyond its phase transition temperature, the contracting wire 34 rotates the lever 32 CCW about fulcrum 33, causing the latch 37 to release lip 38 and enabling the housing 22C to be free to translate laterally to the left. If the wires 27C become spontaneously activated by the ambient overtemperature condition, the device 20C will actuate, but the housing 22C is less constrained to move to the left that is the output rod to move the load to the right. Thus the housing translates leftward, and the load is unmoved. This overtemperature lockout condition persists until the passive wire 34 cools below the phase transition temperature, and the spring 36 returns the lever CW to the latched position, and spring 38 translates the housing 22C to the right to re-engage the latch 37.

It may be noted that the passive wire 34 may have a phase transition temperature that is below that of the wires 27C, so that the latch 37 is certain to release before the wires 27C are spontaneously activated by the ambient overtemperature condition. Additionally or alternatively, the wire 34 may be positioned to be exposed to any anticipated heat source, such as adjacent heat generating devices or objects, or the like.

Figure 6:
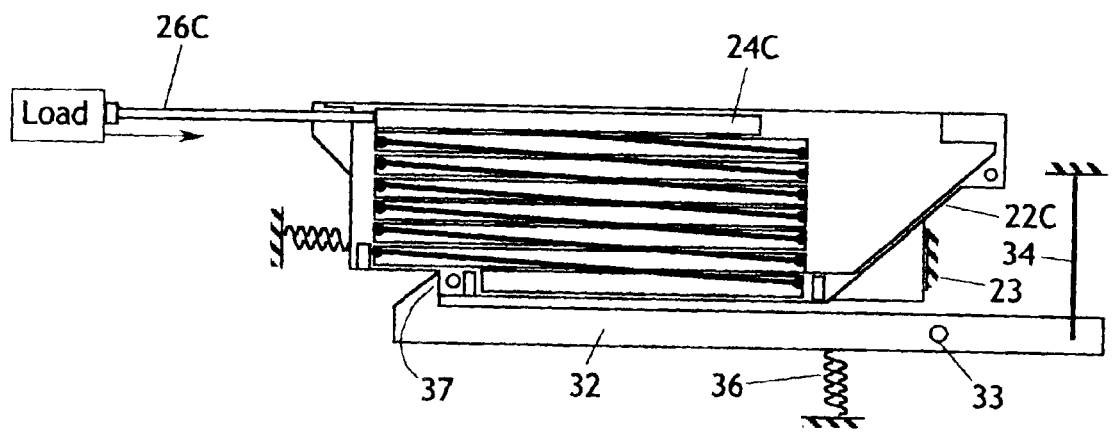
FIG. 6 is a side elevation as in FIG. 5, showing that embodiment set up to retract upon actuation.

With regard to FIG. 6, the output rod 26C may be connected to extend leftward from the left end of the topmost link 24C, so that the output rod 26C retracts upon actuation of the device. The lever assembly and latch function and their overtemperature lockout function are substantially as described with reference to FIG. 5.

Figure 7:
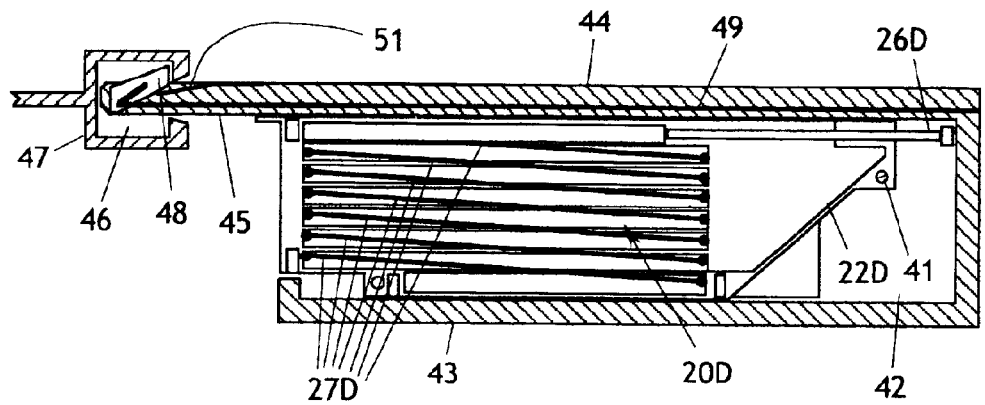
FIG. 7 is a cross-sectional side elevation depicting a further embodiment of the invention in which a load coupling is operated by a passive SMA wire to decouple the load from the actuator during overtemperature conditions.
Figure 8:
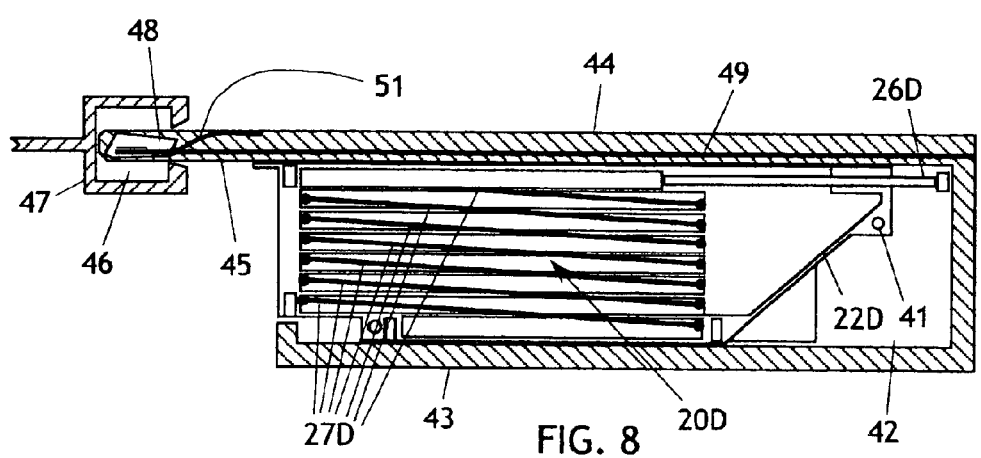
FIG. 8 is a side elevation as in FIG. 7, showing the load coupling disengaged.
Figure 9:
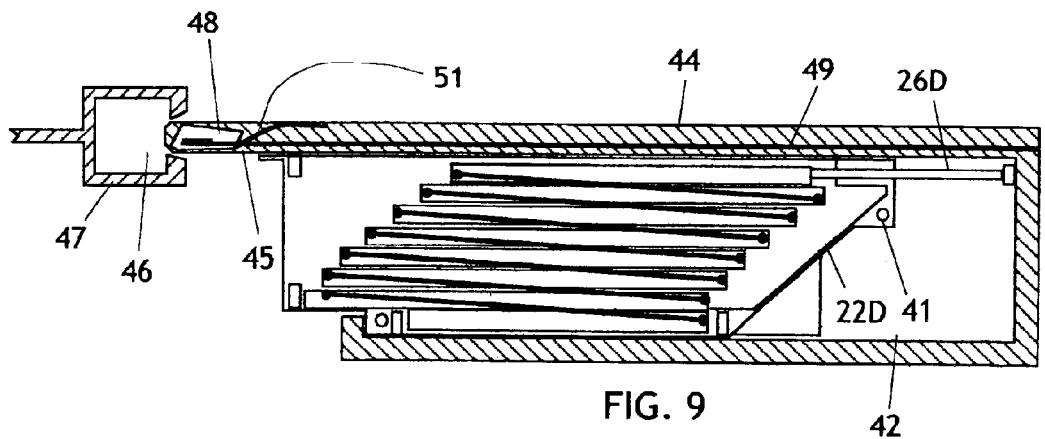
FIG. 9 is a side elevation as in FIGS. 7 and 8, showing the load coupling disengaged and the actuator in the activated state.

A further embodiment of the invention, depicted in FIGS. 7–9, includes the SMA linear actuator 20D, substantially as described previously. The housing 22D of the actuator is placed within a opening 42 of a bracket assembly 43, the actuator 20D being constrained thereby to translate only in a direction parallel to the output link 26D. The housing 22D is pinned to a mechanical ground, as shown by reference numeral 41, so that the actuator 20D is immobilized and the bracket assembly may translate laterally. When the actuator 20D is activated by applying electrical current through its SMA wires, the output rod 26D extends to the right, as shown in FIG. 9, and translates the bracket assembly 43 rightward in concert therewith.

Figure 10:
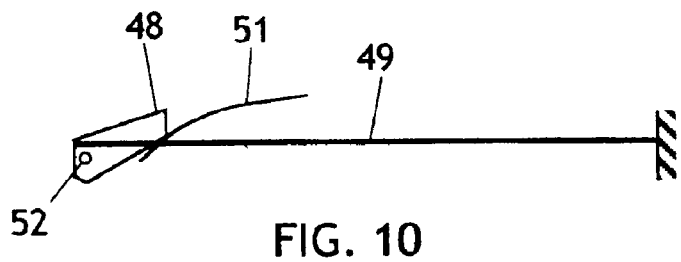
FIGS. 10 and 11 are detailed views showing the quiescent state and activated state of the latching mechanism of the embodiments of FIGS. 7–9.

Integral with the bracket assembly 43 is an output link 44 extending parallel to the output rod 26D. One end 45 of the link 44 is received within the opening 46 of a load connector 47, which is joined to a load device. A pivoting latch arm 48 is secured to the end 45 and positioned to engage or disengage the connector 47. A passive SMA wire 49 extends along the link 44, one end connected to the latch arm 48 and the other end connected to the bracket assembly 43. As shown in FIG. 10, the SMA wire 49 is connected to the latch arm at a point proximate to the latch arm pivot 52, so that a small amount of contraction of the wire 49 will cause sufficient rotation of the latch arm 48 to achieve disengagement. The latch arm is maintained in an engaged position with the load connector 47, as shown in FIG. 7, by a spring 51, so that the load connector is normally engaged by the latch arm 48 and activation of the actuator 20D drives the bracket assembly, output link 44, and load connector 47 to the right, as viewed in FIG. 7.

Figure 11:
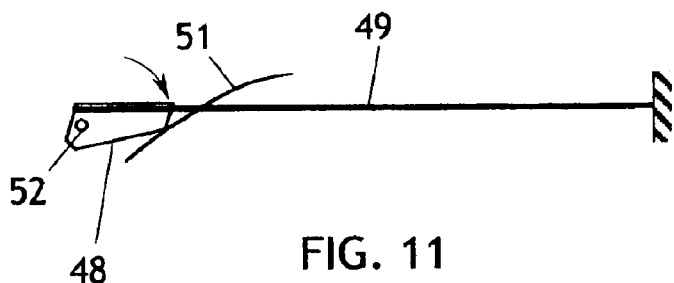

However, if the passive SMA wire 49 is exposed to a heat source having a temperature greater than its phase transition temperature, the wire 49 will contract spontaneously and pull the latch arm 48 from the engaged position of FIGS. 7 and 10 to the disengaged position of FIGS. 8 and 11. Once the latch arm 48 is disengaged (FIG. 8), spontaneous activation of the actuator 20D will cause the output rod 26D to push the bracket assembly 43 to the right but, being uncoupled from the load, will not translate the load. Thus an overtemperature condition cannot cause unintentional movement of the load.

As noted previously, the passive wire 49 may have a phase transition temperature that is below that of the SMA wires 27D of device 20D, so that the latch 47 is certain to release before the wires 27D are spontaneously activated by the ambient overtemperature condition. Additionally or alternatively, the wire 49 may be positioned to be exposed to any anticipated heat source.

Figure 12:
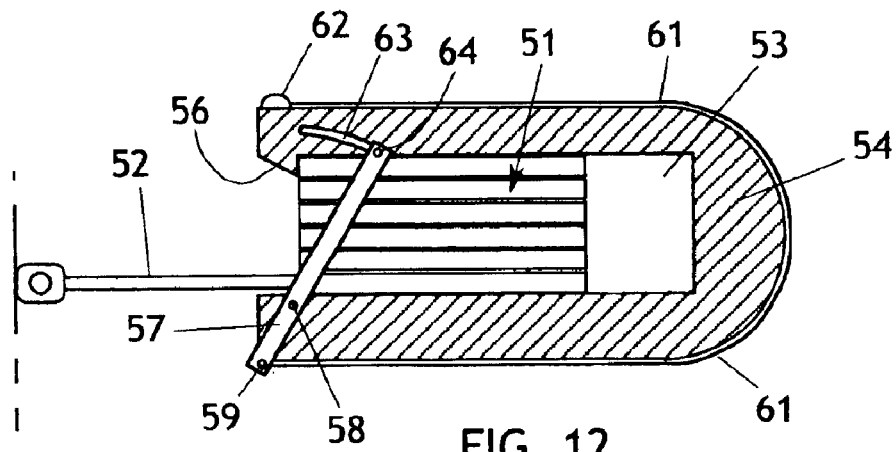
FIGS. 12–14 are a sequence of cross-sectional side elevations depicting the activation states of another embodiment of the invention in which an actuator housing provides an integral actuator release mechanism during overtemperature conditions.
Figure 13:
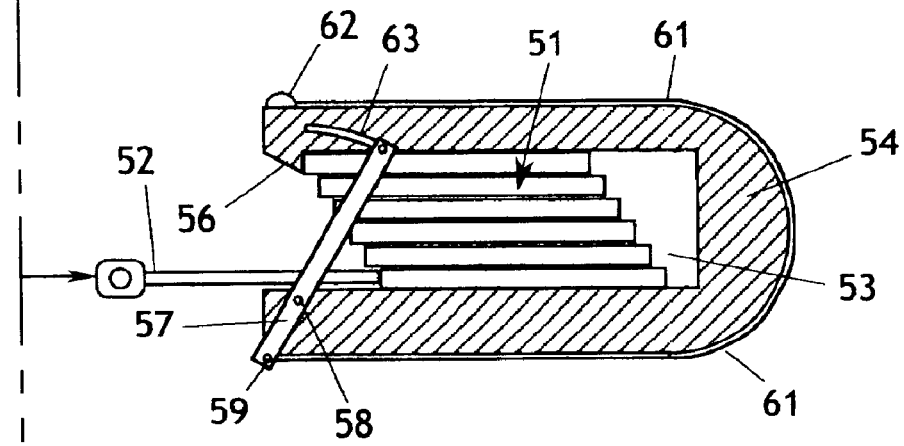

Another embodiment of the invention, depicted in FIGS. 11–13, includes a plurality of sliding links 51 in a stacked array and having a plurality of SMA wires connected therebetween (not shown), as described previously with respect to FIGS. 1 and 2. An output rod 52 extends from the top link of the stack, which is disposed to retract upon activation of the actuator and translate to the right as viewed in FIG. 12. The links 51 are secured within the interior space 53 of a housing 54. The housing 54 has a horseshoe configuration, and the interior space 53 provides clearance for the links 51 to move to their activated position, as shown in FIG. 12.

One end 56 of the horseshoe shaped housing comprises a latch that engages the stack of links 51 to prevent leftward movement as the output rod 52 retracts to the right. A lever 57 is pivotally secured to the other end of the housing 54 by a pin 58 extending through one end of the lever and into the housing. A passive SMA wire 61 is disposed at the exterior of the housing 54, one end being secured to the lever 57 at a point that is proximate to the pivot pin 58. The passive wire 61 extends in wraparound fashion about the outer surface of the horseshoe shaped housing 54 and is secured at anchor 62. The curve of the horseshoe has a radius that is at least 10–100 times the diameter of the wire 61, so that there is insufficient bending stress to detract from the expected behavior of the shape memory material.

Figure 14:
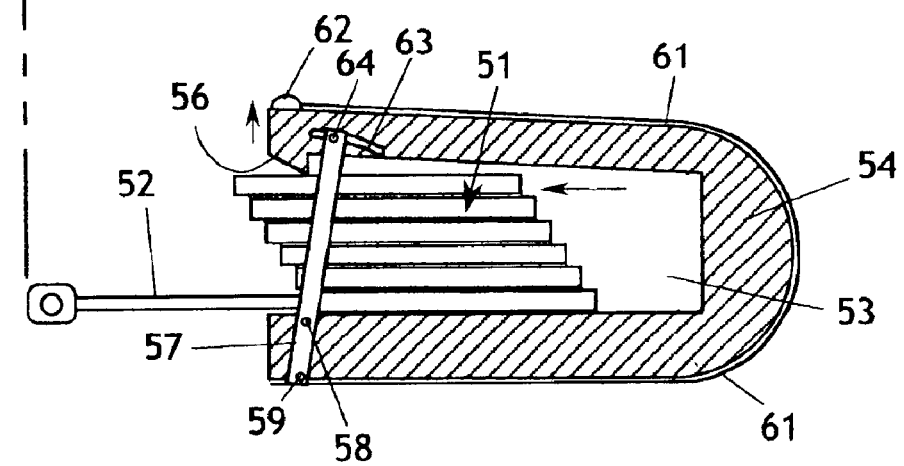

At the other end of the lever 57, a pin extends from the lever end into a curved slot 63 intruding into the housing 54 adjacent to the latch end 56. The slot 63 acts as a cam surface interacting with the pin 64. If the SMA wire 61 is heated by ambient conditions to a temperature greater than its phase transition temperature, the wire contracts and causes the lever 57 rotate CCW. The pin 64 is driven to translate along the slot 63, and the cam effect of the slot 63 acting on the pin 64 causes the latch end 56 to flex and widen the horseshoe shape, as shown in FIG. 14. The latch end 56 releases the stack of links 51, thereby effectively preventing the unanchored stack from retracting the output rod 52. Thus, as shown in FIG. 14, if the stack of links 51 does become activated by ambient overtemperature conditions, the stack will translate toward the load, rather that the load being translated toward the actuator. As a result, no work is done on the load, and no unintentional, spontaneous actuation of the load can occur do to overtemperature conditions.

Note that the natural resiliency of the horseshoe housing 54 provides a restoring force that tends to move the opposed horseshoe ends together again, thus urging the latch end 56 to once again engage the stack of links 51 when it cools and resumes its quiescent disposition (with or without the assist of a return spring), as shown in FIG. 12. The same restoring force also applies some tension to the passive SMA wire 61 as it cools, thus urging the wire 61 to return to 100% length.

As noted previously, the passive wire 61 may have a phase transition temperature that is below that of the SMA wires connecting links 51, so that the latch 56 is certain to release before the wires of the stack of links are spontaneously activated by the ambient overtemperature condition. The wire 61 wraps around the horseshoe exterior surface, and is displayed have wide ranging exposure on three sides of the horseshoe shaped housing 54. Thus the placement of the wire 61 increased the likelihood that the wire 61 will overheat and activate the safety release latch 56 before the stack of links 51 can be activated by the overtemperature event.

It may be appreciated that all the embodiments described herein have in common the use of a passive SMA component to prevent the delivery of the actuating stroke from the actuator to the load. The mechanisms for achieving this prevention generally either decouple the load from the output rod, or release the actuator body from mechanical ground so the output rod cannot apply force to the load, or apply the passive SMA component in countervailing effect to the actuator to neutralize displacement caused by overtemperature conditions.

In the previous descriptions some embodiments include the use of springs to apply a restoring force to the SMA wires as they cool and expand. This expedient may be applied to embodiments herein in which restoring springs are not mentioned explicitly.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. A safety mechanism for an actuator said actuator including at least one active shape memory alloy component selectively heated to deliver an actuating stroke,
   a passive shape memory alloy component exposed to ambient temperature conditions and activated by exceeding the phase transition temperature of said passive shape memory alloy component due to an ambient overtemperature condition;
   means operated by said passive shape memory alloy component for preventing said delivery of said actuating stroke.

2. The safety mechanism of claim 1, wherein said means for preventing delivery of said actuating stroke include means for decoupling the output of said actuator from a load.

3. The safety mechanism of claim 1, wherein said means for preventing delivery of said actuating stroke include means for releasing said actuator from mechanical ground whereby said actuator cannot apply force to a load.

4. The safety mechanism of claim 1, wherein said means for preventing delivery of said actuating stroke include means for connecting said passive shape memory alloy component in countervailing effect to said actuator to neutralize displacement caused by said overtemperature condition.

5. In a displacement multiplied actuator driven by selectively activated shape memory alloy components to deliver an output stroke, a safety mechanism for preventing spontaneous activation in an overtemperature condition, including:
   at least one passive shape memory alloy component exposed to ambient temperature conditions and activated by being passively heated to exceed the phase transition temperature of said at least one passive shape memory alloy component due to an ambient overtemperature condition;
   means operated by contraction of said passive shape memory alloy component for preventing said delivery of said output stroke.

6. The safety mechanism of claim 5, wherein said actuator comprises a first DM-SMA actuator having a first output in a first direction; and said at least one passive shape memory alloy component comprises a second DM-SMA actuator having a second output in a second direction.

7. The safety mechanism of claim 6, further including means for joining said first and second actuators so that said first and second output directions are parallel and opposite and said first and second outputs are additive and countervailing.

8. The safety mechanism of claim 6, further including means for selectively powering said second actuator.

9. The safety mechanism of claim 5, wherein said means for preventing said delivery of said output stroke includes a latch assembly for selectively immobilizing or freeing said actuator for translation in a direction opposite and parallel to said output stroke.

10. The safety mechanism of claim 9, wherein said latch assembly includes a lever arm supported at a fulcrum.

11. The safety mechanism of claim 10, wherein said passive shape memory alloy component includes a SMA wire having one end connected to one end of said lever arm.

12. The safety mechanism of claim 11, wherein the other end of said SMA wire is connected to a mechanical ground.

13. The safety mechanism of claim 12, wherein the other end of said lever arm includes a latch for releasably engaging said actuator.

14. The safety mechanism of claim 13, wherein the distance from said latch to said fulcrum is greater than the distance from said fulcrum to said one end of said lever arm, whereby the contraction of said SMA wire is amplified by said lever arm to move said latch a distance greater than said contraction of said SMA wire.

15. The safety mechanism of claim 9, further including a housing having a horseshoe configuration and an interior space between opposing arms, said actuator being received in said interior space.

16. The safety mechanism of claim 15, wherein said latch assembly is disposed at an end of one of said opposing arms.

17. The safety mechanism of claim 16, wherein said means for preventing delivery of said stroke includes a lever arm extending between said opposing arms of said housing and pivotally secured to an end of one of said arms.

18. The safety mechanism of claim 17, wherein said passive shape memory alloy component includes a SMA wire connected to one end of said lever arm.

19. The safety mechanism of claim 18, wherein said SMA wire extends from said one end of said lever arm to circumscribe the outer surface of said horseshoe configuration.

20. The safety mechanism of claim 19, wherein the other end of said SMA wire is anchored to an end of said other arm of said housing.

21. The safety mechanism of claim 19, wherein the other end of said lever arm is disposed proximate to said latch, and further including a pin extending from said other end of said lever, said pin extending to engage a camming slot in said latch end.

22. The safety mechanism of claim 21, wherein said camming slot is configured to drive said opposing arms to diverge and said latch to disengage said actuator as said SMA wire contracts and rotates said lever about said fulcrum.

23. The safety mechanism of claim 22, wherein said housing is generally resilient and exerts an intrinsic restoring force to converge said opposing arms.

24. The safety mechanism of claim 5, wherein said means for preventing said delivery of said output stroke includes load connector means extending between said actuator and a load for selectively releasing said load when said at least one passive shape memory alloy component is activated.

25. The safety mechanism of claim 24, wherein said load connector means includes a bracket assembly having an interior space in which said actuator is disposed.

26. The safety mechanism of claim 25, wherein said actuator is secured to a mechanical ground, and said interior space is dimensioned to provide limited translation of said bracket assembly in a direction parallel to said output stroke.

27. The safety mechanism of claim 26, wherein said load connector means includes a link extending from said bracket assembly to a load connector.

28. The safety mechanism of claim 27, further including a latch supported on said link for releasably engaging said load connector.

29. The safety mechanism of claim 28, wherein said at least one passive shape memory alloy component includes an SMA wire connected to said latch, said SMA wire extending along said link.

30. The safety mechanism of claim 29, wherein contraction of said SMA wire operates said latch to free said load connector from said link, whereby said actuator cannot affect said load.

* * * * *